(12) United States Patent
Suefuji (10) Patent No.: US 8,757,631 B2
(45) Date of Patent: Jun. 24, 2014

(54) MECHANICAL SEAL DEVICE

(75) Inventor: Yoshihiro Suefuji, Tokyo (JP)

(73) Assignee: Eagle Industry Co., Ltd., Tokyo (JP)

( * ) Notice: Subject to any disclaimer, the term of this patent is extended or adjusted under 35 U.S.C. 154(b) by 469 days.

(21) Appl. No.: 13/255,981

(22) PCT Filed: Jul. 12, 2010

(86) PCT No.: PCT/JP2010/061795
§ 371 (c)(1),
(2), (4) Date: Sep. 12, 2011

(87) PCT Pub. No.: WO2011/007765
PCT Pub. Date: Jan. 20, 2011

(65) Prior Publication Data
US 2012/0001394 A1 Jan. 5, 2012

(30) Foreign Application Priority Data

Jul. 16, 2009 (JP) ................................ 2009-167889

(51) Int. Cl.
*F16J 15/38* (2006.01)
*F16J 15/34* (2006.01)

(52) U.S. Cl.
CPC ................................ *F16J 15/3464* (2013.01)
USPC .......................................... 277/390; 277/397

(58) Field of Classification Search
CPC .. F16J 15/3464; F16J 15/3472; F16J 15/3476
USPC .................................. 277/358, 370, 390, 397
See application file for complete search history.

(56) References Cited

U.S. PATENT DOCUMENTS

| 4,434,986 | A | * | 3/1984 | Warner | 277/369 |
| 5,490,679 | A | * | 2/1996 | Borrino et al. | 277/369 |
| 5,630,699 | A | * | 5/1997 | Kirby et al. | 415/111 |
| 7,229,076 | B2 | * | 6/2007 | Kudari et al. | 277/361 |
| 2004/0173971 | A1 | | 9/2004 | Kudari et al. | |
| 2006/0261559 | A1 | | 11/2006 | Kudari et al. | |

FOREIGN PATENT DOCUMENTS

| JP | 292170 | 7/1990 |
| JP | 2538900 | 4/1997 |
| JP | 2004263802 | 9/2004 |
| JP | 2005140258 A | 6/2005 |
| WO | WO2006022378 A1 | 3/2006 |

* cited by examiner

*Primary Examiner* — Vishal Patel
*Assistant Examiner* — Nicholas L Foster
(74) *Attorney, Agent, or Firm* — Harness, Dickey & Pierce, PLC (57) ABSTRACT

Provided is a mechanical sealing device which is simply configured and wherein a rotation ring can be stably held in a specified axial position, and warping of the sealed surfaces can be prevented, thereby making it possible to obtain appropriate sealing characteristics. In a mechanical sealing device, a rotation ring is axially held between a rotation ring locking surface of a sleeve and a rotation ring locking surface of a collar. Furthermore, the sleeve, the rotation ring fixing collar, and the rotation ring are integrated together by means of a baffle knock pin for the rotation ring. Due to the above, whether positive pressure or negative pressure is applied, the rotation ring does not move, nor do the sealed surfaces of the rotation ring become warped. Moreover, assembly can be simply performed only by means of the knock pin.

1 Claim, 7 Drawing Sheets

MECHANICAL SEAL DEVICE

TECHNICAL FIELD

The present invention relates to a mechanical seal device able to compactly and stably fix a rotational ring to a rotary shaft.

BACKGROUND ART

In the past, various embodiments have been proposed for a structure for fixing a rotational ring to a rotary shaft in this type of mechanical seal devices.

For example, known embodiments include an embodiment to fix with a set screw at the inside (e.g. Japanese Utility Model Publication H2-92170 (Patent Document 1)), an embodiment to fix with a sleeve at the outside (e.g. PCT International Publication WO2006/022378 (Patent Document 2)), an embodiment to fix with a seal nut (e.g. Japanese Utility Model Registration No. 2538900 (Patent Document 3)) or an embodiment to fix with two kinds of sleeves (e.g. Japanese Unexamined Patent Publication No. 2005-140258 (Patent Document 4)), etc.

[patent document 1] Japanese Utility Model Publication No. H2-92170
[patent document 2] PCT International Publication WO2006/022378
[patent document 3] Japanese Utility Model Registration No. 2538900
[patent document 4] Japanese Unexamined Patent Publication No 2005-140258

DISCLOSURE OF INVENTION

Problem to be Solved by the Invention

There is a problem that any of the conventional methods of fixation of a rotational ring requires a considerable space in an axial direction and in a radial direction. Therefore, as a relatively easy embodiment for fixing a rotational ring, for example, an embodiment using a snap ring shown in FIG. 6 and an embodiment using a knock pin shown in FIG. 7 are widely used. Another embodiment may require no stopper under the condition that only a positive pressure (a pressure to thrust a rotational ring toward the outside) is placed onto a rotational ring.

Figure 6:
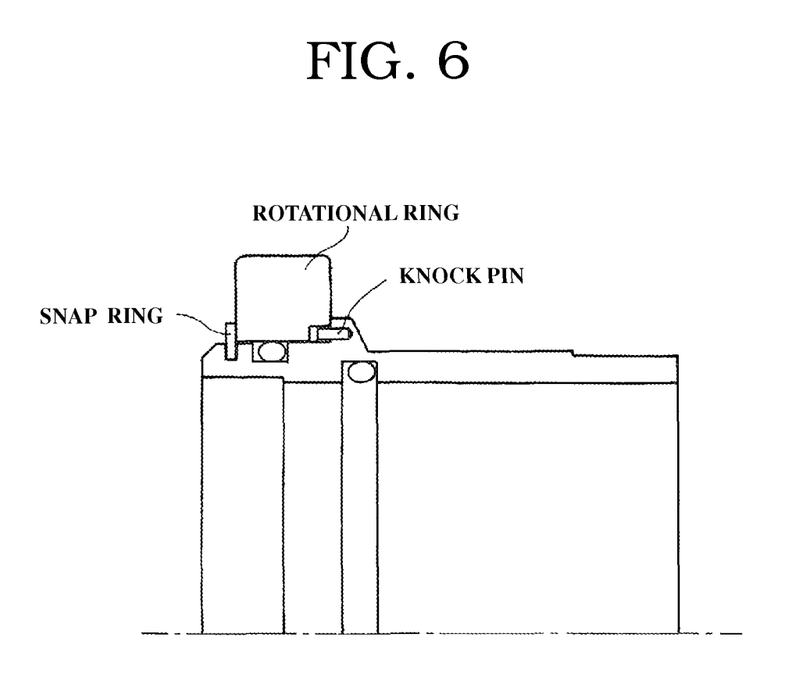
FIG. 6 is a figure showing a conventional method of fixation for a rotational ring and showing a constitution for fixing a rotational ring using a snap ring.
Figure 7:
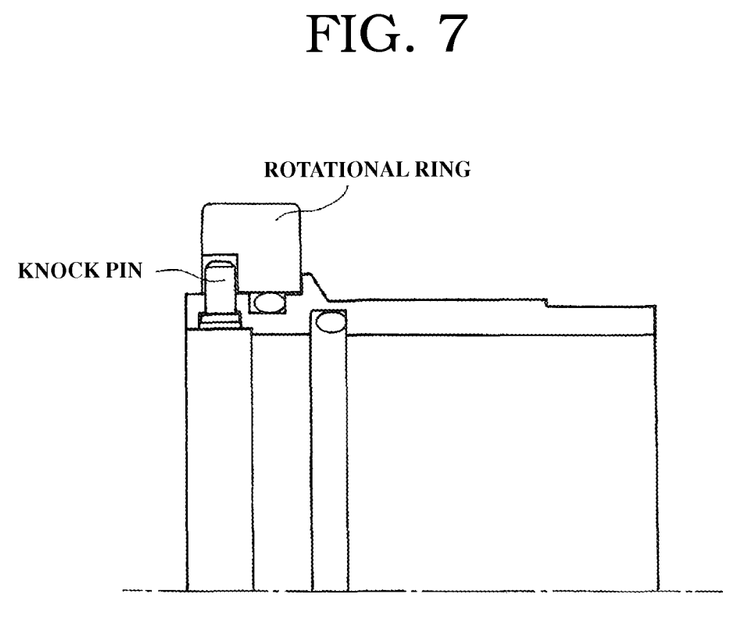
FIG. 7 is a figure showing a conventional method of fixation for a rotational ring and showing a constitution for fixing a rotational ring using a knock pin.

However, in the embodiment using a snap ring shown in FIG. 6, the snap ring may come off a groove portion because of erosion of the snap ring caused by exposure of the snap ring to inside liquid medium, and abrasion of the snap ring. In this case, the snap ring in such a constitution may be get into inside, which may cause serious problems depending on use conditions.

Also, the embodiment using a knock pin shown in FIG. 7 and the embodiment without stopper may be applicable in the condition that only a positive pressure works to the rotational ring, but under a negative pressure, problems will arise. In the embodiment using a knock pin shown in FIG. 7, the knock pin may come to support the rotational ring under the negative pressure, causing distortion on the sealing surface and leak of a sealing liquid. Also, in the structure without stopper, the rotational ring may come off the sleeve under the negative pressure, so that the seal device does not work at all.

The present invention has been made in view of the above problems, and its purpose is to provide a mechanical seal device, having a compact structure which requires no large space both in an axial direction and in a radial direction in a structure for fixing a rotational ring to a rotary shaft, showing simple constitution, able to reduce influences of erosion and abrasion, able to obtain appropriate seal performance by stably maintaining the rotational ring in an axial direction both under positive pressure and negative pressure, and able to obtain stable seal properties without distorting a sealing surface of the rotational ring.

Means for Solving the Problem

To solve the above problem, the mechanical seal device of the present invention comprises a rotational ring installed in a rotary shaft to integrally rotate the same with the rotary shaft and formed with a sealing surface on at least one of its surfaces in an axial direction; a stationary ring formed with a sealing surface to sealingly contact to and slide with the sealing surface of the rotational ring; a rotational ring fixing portion for fixing the rotational ring to the rotary shaft; and a cover portion for containing the rotational ring and the stationary ring and for supporting the stationary ring so as to press the stationary ring axially movably in a direction of the rotational ring, wherein the rotational ring fixing portion comprises a sleeve fixturable to a surrounding surface of the rotary shaft, the sleeve having a rotational ring latching surface for latching together the rotational ring axially from outside or inside, and a through-bore in a radial direction for inserting a knock pin; and a rotational ring fixing collar fitted into the sleeve and arranged on axially inside or outside of the sleeve, the collar for fixing a rotational ring having a rotational ring latching surface for latching together the rotational ring from an opposing direction of the rotational ring latching surface of the sleeve, and a through-bore for inserting a knock pin in a radial direction communicating to the through-bore of the sleeve when the collar is fitted into the sleeve; and wherein the rotational ring is axially sandwiched by the rotational ring latching surface of the sleeve and the rotational ring latching surface of the rotational ring fixing collar, and is fixed to the sleeve and the rotational ring fixing collar in circumferential direction by engaging a knock pin inserted through the through-bores communicated with each other from an inner circumference side to a concave portion formed on the rotational ring.

According to the mechanical seal device of the present invention having such a constitution, it is possible to achieve a compact structure which requires no large space in an axial direction and in a radial direction in a structure for fixing a rotational ring to a rotary shaft, to show simple constitution, to reduce influences of erosion and abrasion, to obtain appropriate seal performance by stably maintaining the rotational ring in an axial direction both under positive pressure and negative pressure, and to obtain stable seal properties without distorting a sealing surface of the rotational ring.

MODE FOR WORKING THE INVENTION

A mechanical seal device of one embodiment of the present invention will be explained in reference to FIG. 1 to FIG. 5.

The present invention will be explained with an example of a mechanical seal device of the present embodiment, which is mounted in a cartridge form on an external surface of a housing of the desired apparatus in which a rotary shaft is penetrated and has a double seal constitution in which two sliding surfaces are arranged back to back. The mechanical seal device of the present embodiment is a mechanical seal device preferable to be used, for example, as an axial seal of a centrifugal pump.

Figure 1:
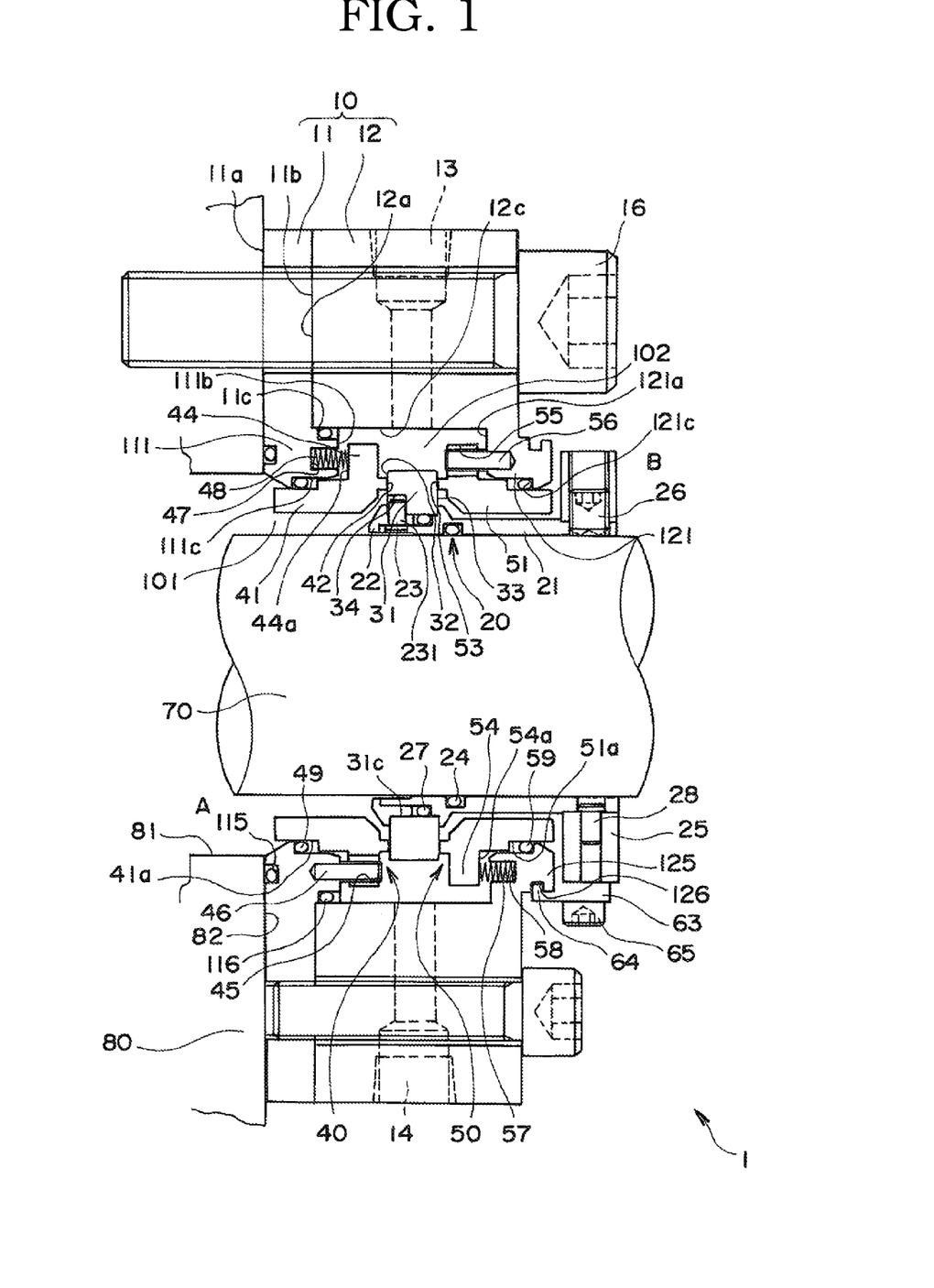
FIG. 1 is a figure showing a constitution of a mechanical seal device of one embodiment of the present invention.

FIG. 1 is a cross-sectional view showing the constitution of the mechanical seal device 1 of the present embodiment, in which the mechanical seal device 1 is mounted to the external surface 82 of the housing 80.

Figure 2:
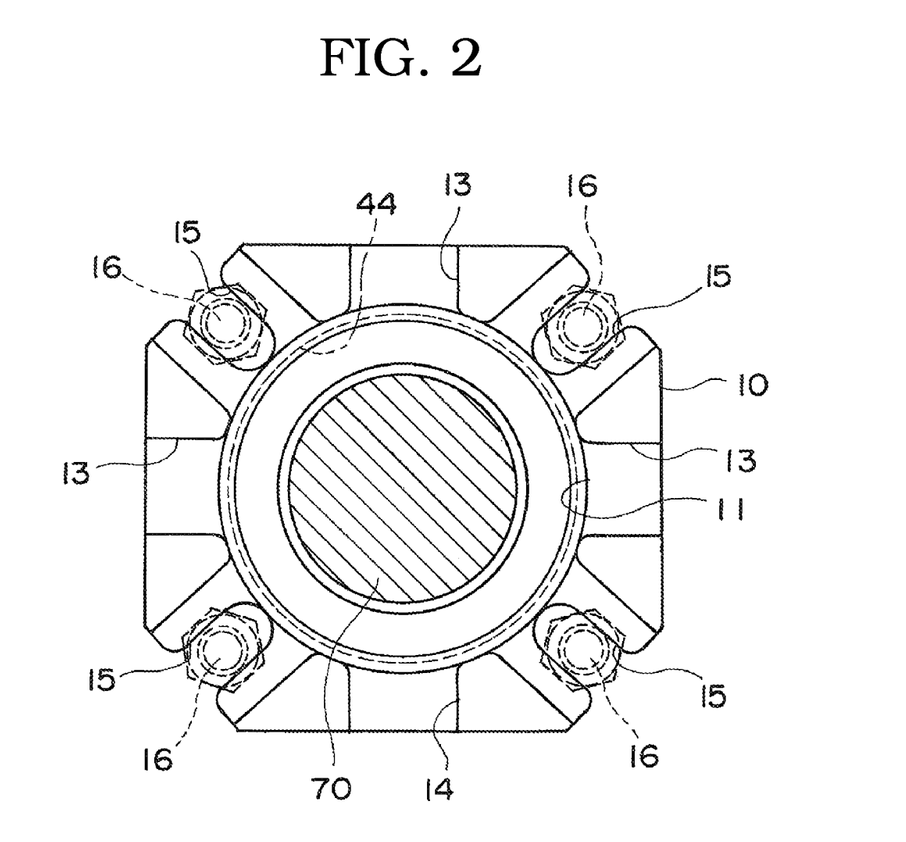
FIG. 2 is a plane view in an axial direction showing that the mechanical seal device in FIG. 1 is fitted into a rotary shaft.

FIG. 2 is a plane view in an axial direction showing that the seal device 1 in FIG. 1 is fitted into a rotary shaft 70.

As shown in FIG. 1, the housing 80 is formed with a shaft bore 81 penetrated by the rotary shaft 70, and the mechanical seal device 1 is installed on the external surface 82 around the shaft bore 81.

Note that the side of the shaft bore 81 of the housing 80 (left side in the figure) is an inside space A, and its opposite side in an axial direction (right side in the figure) is an outside space, i.e. air space B, in FIG. 1.

The mechanical seal device 1 comprises, as its main components, a cover portion 10, a rotational ring fixing portion 20, a rotational ring (mating ring) 31, an inside stationary ring (inside seal ring) 41 and an outside stationary ring (outside seal ring) 51. The cover portion 10 further has a flange cover 11 and a seal cover 12, and also, the rotational ring fixing portion 20 has a sleeve 21, a rotational ring fixing collar 22, knock pins 23 and 28, O-rings 24 and 27, a sleeve collar 25 and a set screw 26.

In the mechanical seal device 1, an inside sealing surface 32 of the rotational ring 31 and an inside stationary ring 41 constitute an inside seal portion 40, and an outside sealing surface 33 of the rotational ring 31 and an outside stationary ring 51 constitute an outside (air-side) seal portion 50.

The cover portion 10 has the flange cover 11 arranged inside in an axial direction, and the seal cover 12 arranged outside in an axial direction, all of which are integrally installed in the housing 80 of the apparatus. An inner circumference portion of an outside end face 11b of the flange cover 11 is projected to axially outside at a place corresponding to the after-mentioned inside stationary ring installing portion 111 with a predetermined width, so that a step (step surface 11c) is formed with respect to the outer circumference portion. An inside end portion of an inner circumference surface 12c of the seal cover 12 is fitted into the step surface 11c of the flange cover 11, the outside end face 11b of the flange cover 11 and an inside end face 12a of the seal cover 12 are sealingly contacted, and the flange cover 11 and the seal cover 12 are concentrically combined. In this state, an internal through-hole 101 is formed in the cover portion 10, which is connected to the shaft bore 81 of the housing 80 to let the rotary shaft 70 get through when the cover portion 10 is installed in the housing 80.

The cover portion 10 is formed such that the planar shape of its inside in a direction perpendicular to an axial direction is approximately square as shown in FIG. 2, and an installing groove 15, cut in from outside of the corner portion toward inside in diagonal direction, is formed in each corner portion of the cover portion 10 in a plane perpendicular to an axial direction. A bolt 16 is got through each of these four installing grooves 15 from outside, and tightened in a bolt hole formed on the corresponding position in the external surface 82 of the housing 80, so that the mechanical seal device 1 is fixedly installed on the external surface 82 around the shaft bore 81 of the housing 80.

On this occasion, as shown in FIG. 1, O-ring 115 intervenes between an inside end face 11a of the flange cover 11 and the external surface 82 of the housing 80. Also, O-ring 116 intervenes between the flange cover 11 and the seal cover 12 on the step surface 11c in the fitting portion thereof. This allows sealing of the external space (air space B) of the cover portion 10 and the internal through-hole 101 which is an internal space of the cover portion 10.

An inside end portion of the internal through-hole 101 of the cover portion 10, i.e. the inner circumference portion of the flange cover 11, is projected in flange shape into the inner side than the inner circumference surface near the axial center part of the internal through-hole 101 (inner circumference surface 12a of the seal cover 12) to form the inside stationary ring installing portion 111. As mentioned above, the place corresponding to the inside stationary ring installing portion 111 of the flange cover 11 is projected to axially outside with a predetermined height, and the step (step surface 11c) is formed with respect to the outside end face 11b of the outer circumference portion of the flange cover 11. Also, the step surface 11c is formed with a groove for installing the O-ring 116.

On an inner circumference side of the inside stationary ring installing portion 111, the after-mentioned inside stationary ring 41 is fitted and installed in an axially movable condition. On the inner circumference surface of the inside stationary ring installing portion 111, a stairstep portion 111c having a step in an axial direction is formed to face a stairstep portion 41a formed on the inside stationary ring 41, and O-ring 49 is arranged in an annular space having a rectangular cross-section formed between the stairstep portion 41a and the stairstep portion 111c. By making the O-ring 49 intervene in the annular space and fitting the inside stationary ring 41 into the inside stationary ring installing portion 111, the cover portion 10 and the inside stationary ring 41 are axially sealed in the internal through-hole 101 of the cover portion 10.

Also, in an outside end face 111b of the inside stationary ring installing portion 111, a fixing pin 46, projecting outside in an axial direction and fitted and inserted into a guiding groove 45 formed in a flange portion 44 of the inside stationary ring 41, is provided.

Also, the same outside end face 111b of the inside stationary ring installing portion 111 is provided with a plurality of spring seats 47 toward circumferential direction, resulting in a constitution in which a coil spring 48 is retained between an inside end face 44a of the flange portion 44 of the inside stationary ring 41 and the spring seat 47.

An outside end portion of the internal through-hole 101 of the cover portion 10, i.e. inner circumference portion of an outside end portion of the seal cover 12, is projected in flange shape into the inner side than the inner circumference surface near the axial center part of the internal through-hole 101 (inner circumference surface 12c of the seal cover 12) to form an outside stationary ring installing portion 121 for installing the outside stationary ring 51.

In an inner circumference side of the outside stationary ring installing portion 121, the after-mentioned outside stationary ring 51 is fitted and installed in an axially movable condition. On the inner circumference surface of the outside stationary ring installing portion 121, a stairstep portion 121c having a step in an axial direction is formed to face a stairstep portion 51a formed on the outside stationary ring 51, and O-ring 59 is arranged in an annular space having a rectangular cross-section formed between the stairstep portion 51a and the stairstep portion 121c. By making the O-ring 59 intervene in the annular space and fitting the outside stationary ring 51 into the outside stationary ring installing portion 121, the cover portion 10 and the outside stationary ring 51 are axially sealed in the internal through-hole 101 of the cover portion 10.

Also, in an inside end face 121a of the outside stationary ring installing portion 121, a fixing pin 56, projecting inside in an axial direction and fitted and inserted into a guiding groove 55 formed in a flange portion 54 of the outside stationary ring 51, is installed.

Also, the same inside end face 121a of the outside stationary ring installing portion 121 is provided with a plurality of spring seats 57 toward circumferential direction, resulting in a constitution in which a coil spring 58 is retained between an outside end face 54a of the flange portion 54 of the outside stationary ring 51 and the spring seat 47.

The place corresponding to the outside stationary ring installing portion 121 of the inner circumference portion of the seal cover 12 is projected to axially outside with a predetermined height, and the projected outer circumference portion of the outside end portion is formed into a positioning portion 125. The positioning portion 125 has a positioning groove 126 on its outer circumference surface.

When the after-mentioned rotational ring fixing portion 20 is installed in the rotary shaft 70, a set plate 63 having a convex portion 64 is fixed with a socket bolt 65 by fitting the convex portion 64 into the positioning groove 126, and the sleeve collar 25 is installed in the rotary shaft 70 while the set plate 63 intervenes. Thus, the rotational ring fixing portion 20 having the sleeve 21 and the rotational ring fixing collar 22 are defined in predetermined relation of positions to the cover portion 10 by intervention of the sleeve collar 25 and the set plate 63. As a result, the rotational ring 31, the inside stationary ring 41 and the outside stationary ring 51 are set to have respective predetermined position relations.

Note that the set plate 63 is removed after assembling the mechanical seal device 1.

Also, the cover portion 10 is radially formed with four fluid flow paths connecting to an intermediate room 102 from the outer circumference surface, as shown in FIG. 1 and FIG. 2. These four fluid flow paths are three quenching fluid injection paths 13 and one quenching fluid discharge path 14. Each port of the paths 13 and 14 is formed with a pipe screw hole connectable to a pipe (not shown in the figures).

Also, each of the paths 13 and 14 is communicated to an opening formed on a place, which is relatively large in inner diameter, of the internal through-hole 101 near the axial center part of the cover portion 10 (the inner circumference surface 12a of the seal cover 12), and connected to the intermediate room 102 surrounded by the inner circumference surface 12a of the seal cover 12, the rotational ring 31, the inside stationary ring 41 and the outside stationary ring 51, etc.

Quenching fluid supplied through the pipe not shown in the figures in the above constitution is injected from the quenching fluid injection path 13 to the intermediate room 102, flowed directly onto the outer circumference surface of the rotational ring 31, the inside stationary ring 41 and the outside stationary ring 51, and discharged from the quenching fluid discharge path 14. This allows cooling heat generation at sliding and washing impurities adhered to each seal portion, in respective seal sliding surfaces of the inside seal portion 40 and the outside seal portion 50.

The inside stationary ring (inside seal ring) 41 is a seal ring constituting one sealing surface of the inside seal portion 40, and as mentioned above, fitted and installed to an inner circumference side of the inside stationary ring installing portion 111 in an axially movable condition. The inside stationary ring 41 is formed with a sealing surface 42 on its outside end face, and the sealing surface 42 is slidably sealingly contacted to the inside sealing surface 32 of the after-mentioned rotational ring (mating ring) 31 to thus constitute the inside seal portion 40.

The stairstep portion 41a having a step in an axial direction is formed on an outer circumference surface of the inside stationary ring 41. As mentioned above, the O-ring 49 is placed in the annular space between the stairstep portion 41a and the stairstep portion 111c formed on the inner circumference surface of the inside stationary ring installing portion 111, resulting in sealing and fitting together the inside stationary ring installing portion 111 of the cover portion 10 and the inside stationary ring 41.

An outer circumference side of the inside stationary ring 41 is formed as the flange portion 44, and the inside end face 44a of the flange portion 44 is axially formed with the guiding groove 45. As mentioned above, the fixing pin 46, formed on the outside end face 111b of the inside stationary ring installing portion 111 is inserted in the guiding groove 45. The fixing pin 46 and the guiding groove 45 are movable relative to an axial direction, and latched together to circumferential direction, which allows installing the inside stationary ring 41 to be movable in an axial direction but not rotatable in circumferential direction with respect to the inside stationary ring installing portion 111, i.e. the cover portion 10.

Also, the inside end face 44a of the flange portion 44 of the inside stationary ring 41 is provided with a plurality of spring seats 47 in circumferential direction, and as mentioned above, the coil spring 48 is retained between the spring seat formed on the outside end face 111b of the inside stationary ring installing portion 111 and the spring seat 47. This allows pressing the inside stationary ring 41 toward axially outside, i.e. toward the rotational ring 31.

Also, a relatively large gap is formed between the inner circumference surface side of the inside stationary ring 41 and the outer circumference surface of the rotary shaft 70, so as to circulate the sealed fluid in the inside space A without being solidified to clog even when the sealed fluid includes slurry.

The outside stationary ring (outside seal ring) 51 is a seal ring constituting one sealing surface of the outside seal portion 50, and as mentioned above, fitted and installed in an axially movable condition to an inner circumference side of the outside stationary ring installing portion 121. The outside stationary ring 51 is formed with a sealing surface 53 on its outside end face, and the sealing surface 53 is slidably sealingly contacted to an outside sealing surface 33 of the after-mentioned rotational ring (mating ring) 31 to thus constitute the outside seal portion 50.

The stairstep portion 51a having a step in an axial direction is formed on an outer circumference surface of the outside stationary ring 51. As mentioned above, the O-ring 59 is placed in the annular space between the stairstep portion 51a and the stairstep portion 121c formed on the inner circumference surface of the outside stationary ring installing portion 121, resulting in sealing and fitting together the outside stationary ring installing portion 121 of the cover portion 10 and the outside stationary ring 51.

An outer circumference side of the outside stationary ring 51 is formed as the flange portion 54, and the outside end face 54a of the flange portion 54 is axially formed with the guiding groove 55. As mentioned above, the fixing pin 56, formed on the inside end face 121a of the outside stationary ring installing portion 121, is inserted in the guiding groove 55. The fixing pin 56 and the guiding groove 55 are movable relative to an axial direction and latched together to circumferential direction, which allows installing the outside stationary ring 51 to be movable in an axial direction but not rotatable in circumferential direction with respect to the outside stationary ring installing portion 121, i.e. the cover portion 10.

Also, the outside end face 54a of the flange portion 54 of the outside stationary ring 51 is provided with a plurality of spring seats 57 in circumferential direction, and as mentioned above, the coil spring 58 is retained between the spring seat formed on the inside end face 121a of the outside stationary ring installing portion 121 and the spring seat 57. This allows pressing the outside stationary ring 51 toward axially inside, i.e. toward the rotational ring 31.

The rotational ring (mating ring) 31 is a seal ring constituting the other sealing surfaces of the inside seal portion 40 and the outside seal portion 50 respectively, and fitted and installed to the rotary shaft 70 by the rotational ring fixing portion 20.

An inside end face of the rotational ring 31 is formed as the inside sealing surface 32 slidably and sealingly contacted to the sealing surface 42 of the inside stationary ring 41, and an outside end face of the rotational ring 31 is formed as the outside sealing surface 33 slidably and sealingly contacted to the sealing surface 53 of the outside stationary ring 51.

Also, an inner circumference portion of the inside end face (inside sealing surface) 32 is formed in circumferential direction with equal interval with a predetermined number of knock pin engaging cutaway portions 34 for inserting a knock pin 23 for latching together the rotational ring 31 to the rotational ring fixing portion 20 relatively immovably in rotational direction.

The rotational ring fixing portion 20 has the sleeve 21, the rotational ring fixing collar 22, the knock pins 23 and 28, the O-rings 24 and 27, the sleeve collar 25 and the set screw 26, and is installed on the rotary shaft 70 such that the rotational ring 31 is integrally rotatable with the rotary shaft 70.

The sleeve 21 is a cylindrical member closely fitted into the surrounding surface of the rotary shaft 70 via the O-ring 24. The sleeve 21 sandwiches the rotational ring 31 with the rotational ring fixing collar 22 in its inside end portion, and is fixed to the rotary shaft 70 by the sleeve collar 25 in its outside end portion.

Figure 3:
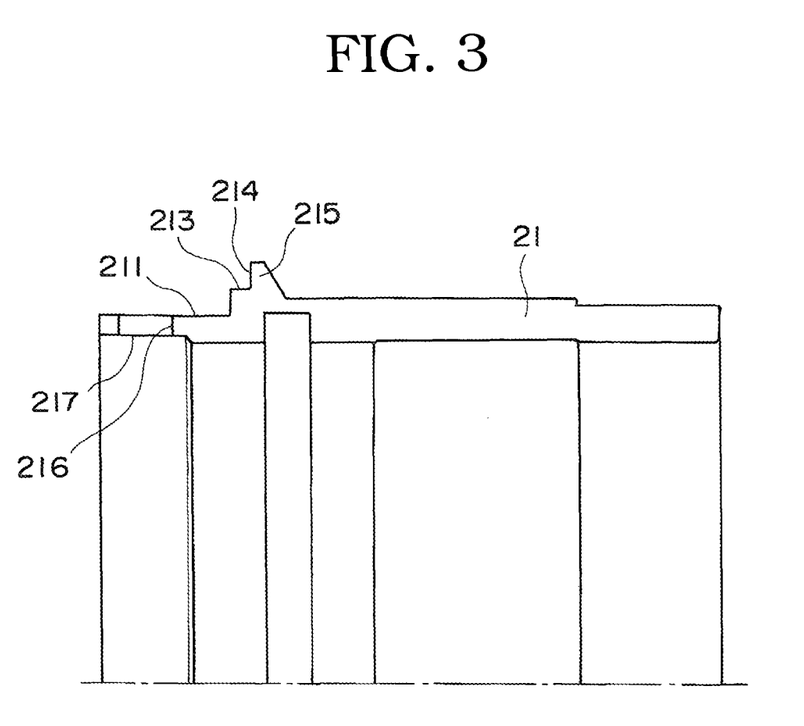
FIG. 3 is an enlarged view for explaining the constitution of a sleeve of the mechanical seal device in FIG. 1.

The constitution of the sleeve 21 is explained based on FIG. 3.

FIG. 3 is an enlarged cross-sectional view of the sleeve 21.

As shown in FIG. 3, an outer circumference surface of the inside end portion of the sleeve 21 is formed with two step surfaces 211 and 213 respectively parallel to the surrounding surface of the rotary shaft 70. The innermost first step surface 211 is smaller, and the second step surface 213 formed outside of the first step surface 211 is formed to be larger by a predetermined length than the first step surface. On the further outside of the second step surface 213, a flange-shaped convex portion 215, formed with a rotational ring latching surface 214 for latching together the rotational ring 31 from outside, is formed.

The rotational ring 31 is installed in the sleeve 21 so as to fit its inner circumference surface 31c into the second step surface 213 of the sleeve 21. The rotational ring 31 is installed in the sleeve 21 such that the inner circumference surface 31c is fitted into the second step surface 213 of the sleeve 21 and further that the inner circumference surface of the outside end face, i.e. inner circumference portion of the outside sealing surface 33, is abutted on a radial surface (rotational ring latching surface) 214 of the inside of the convex portion 215 of the sleeve 21 to prevent the rotational ring 31 from moving to axially outside.

In an annular gap formed between the first step surface 211 of the sleeve 21 and the inner circumference surface 31c of the rotational ring 31, the O-ring 27 and a cylindrical portion 222 of the rotational ring fixing collar 22 are arranged. Namely, in the sleeve 21, the difference in height between the first step surface 211 and the second step surface is a height sufficient for attaining the effect such that the O-ring 27 is arranged to axially seal the rotational ring 31 and the sleeve 21. This is also the predetermined height corresponding to the height (thickness) of the cylindrical portion 222 when the cylindrical portion 222 of the rotational ring fixing collar 22 is arranged.

The cylindrical end portion at the inside in which the first step surface 211 of the sleeve 21 is formed is formed with a predetermined number of knock pin bores 216 along circumferential direction. As mentioned below, the cylindrical portion 222 of the rotational ring fixing collar 22 is also formed with a knock pin bore 226, and the inner circumference portion of the inside end face of the rotational ring 31 is formed with a knock pin cutaway portion 34. The knock pin bores 216 and 226 of the sleeve 21 and the rotational ring fixing collar 22, and the knock pin cutaway portion 34 of the rotational ring 31 are formed to be arranged to concentrically communicate in a radial direction and to form a knock pin inserting bore 231 having an opening at the inside in a radial direction when assembling the sleeve 21, the rotational ring fixing collar 22 and the rotational ring 31.

Note that as the knock pin 23 to be inserted in the knock pin inserting bore 231, a knock pin, formed to have the thickness of its head thinner than the thickness of the cylindrical end portion at the inside in which the knock pin bore 216 of the sleeve 21 is formed, is used. This allows containing the head of the knock pin 23 within the knock pin bore 216 of the sleeve, without protruding at inner diameter side from the sleeve 21.

Also, an inner circumference side of the knock pin bore 216 of the sleeve 21, i.e. the vicinity of an opening of the knock pin inserting bore 231 of an inner circumference of the inside end portion of the sleeve 21, is formed into a step 217 as a runout portion for reducing an area where processing accuracy is required for fitting to the rotary shaft 70 as small as possible and avoiding an influence of deformation, caused by processing for bore, screw and the like on the sleeve 21, on the engaging surface.

Figure 4:
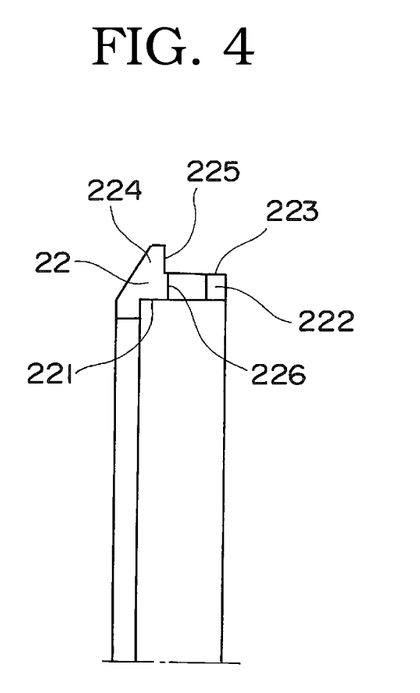
FIG. 4 is an enlarged view for explaining the constitution of a rotational ring fixing collar of the mechanical seal device in FIG. 1.

The rotational ring fixing collar 22 is an annular member for fitting to the sleeve 21 in the inside end portion of the sleeve 21, latching together the rotational ring 31 from its inside and sandwiching the rotational ring 31 with the sleeve 21.

The constitution of the rotational ring fixing collar 22 is explained based on FIG. 4.

FIG. 4 is an enlarged cross-sectional view of the rotational ring fixing collar 22.

As shown in FIG. 4, the rotational ring fixing collar 22 has the cylindrical portion 222, and an inner circumference side of the cylindrical portion 222 is formed with a sleeve engaging step portion 221, which is a strip-shaped cutaway portion opened to the outside and is fitted into the first step surface 211 of the inside end portion of the sleeve 21.

Also, an outer circumference surface of the cylindrical portion 222 is formed into a rotational ring fitting surface 223 fitted into the inner circumference surface 31c of the rotational ring 31, and the outer circumference portion of the inside end portion is formed with a flange-shaped convex portion 224 where a rotational ring latching surface 225 for latching together the rotational ring 31 from the inside is formed.

Also, on the cylindrical portion 222, a predetermined number of the knock pin bores 226, forming the knock pin inserting bore 231 for inserting the knock pin 23 which unifies the sleeve 21, the rotational ring fixing collar 22 and the rotational ring 31 relatively immovably in a rotational direction, is arranged in a circumferential direction with equal interval.

The sleeve collar 25 is a member integrally rotatably fixed to the rotary shaft 70 by the set screw 26 and the knock pin 28, and is fixed to the rotary shaft 70 while fitting into the outer circumference surface of the outside end portion of the sleeve 21. This allows the assembled structure, in which the rotational ring 31 is sandwiched by the sleeve 21 and the rotational ring fixing collar 22, to be fixedly installed in the rotary shaft 70.

Figure 5:
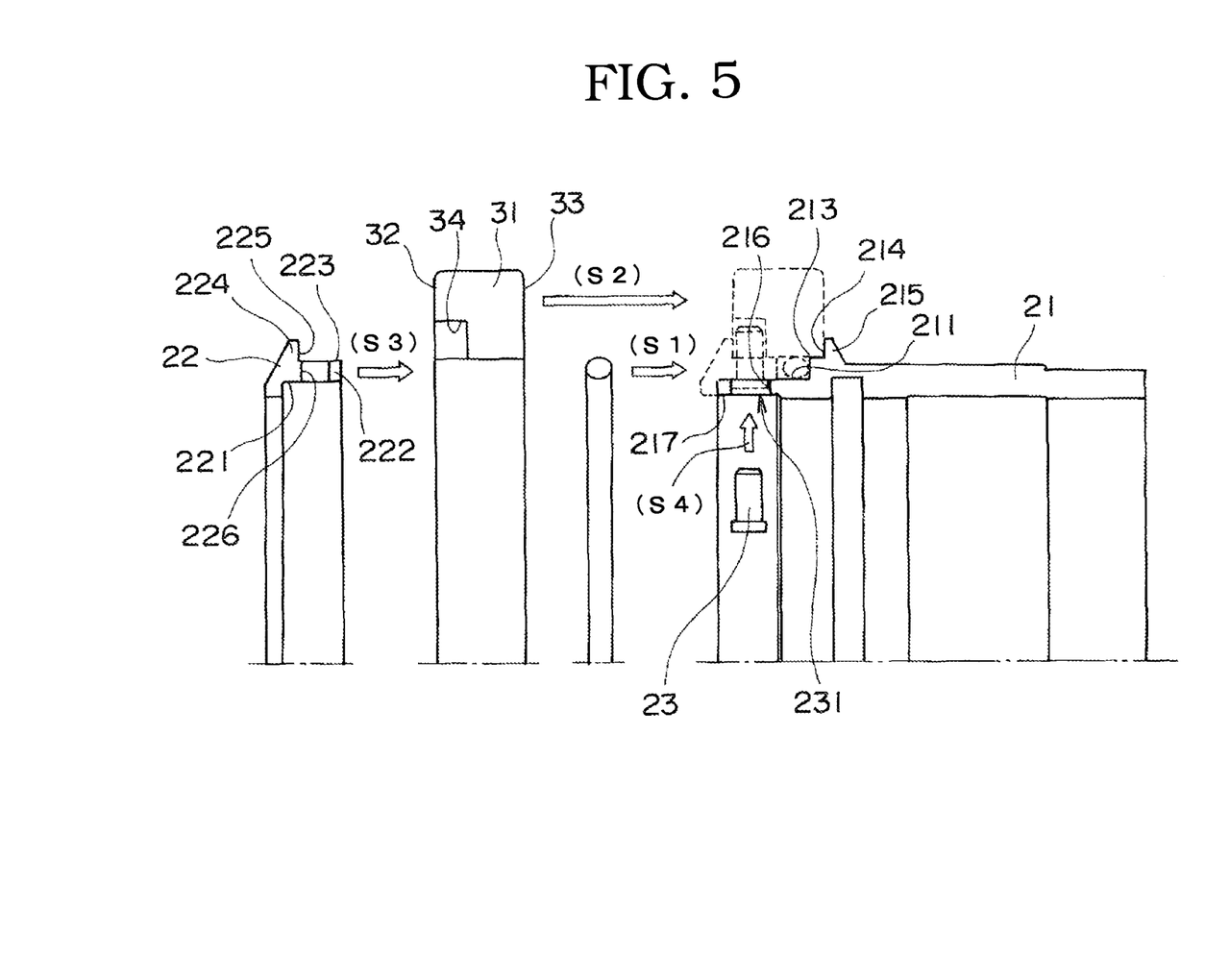
FIG. 5 is a figure for explaining an assembly procedure for installing a rotational ring of the mechanical seal device in FIG. 1 in a rotational ring fixing portion.

A method for installing the rotational ring 31 in the rotary shaft 70 with the rotational ring fixing portion 20 having the above constitution, i.e. a method for assembling the assembled structure in which the rotational ring 31 is sandwiched by the sleeve 21 and the rotational ring fixing collar 22 and then installing the assembled structure in the rotary shaft 70, is explained based on FIG. 5.

First, the O-ring 27 is inserted in the first step surface 211 of the sleeve 21 (procedure S1).

Then, the rotational ring 31 is fitted into the sleeve 21 where the O-ring 27 is mounted. The rotational ring 31 is installed in the sleeve 21 by inserting the same into the sleeve 21 until its inner circumference surface 31c is fitted into the outer circumference side of the O-ring 27 and the second step surface 213 of the sleeve 21 and its outside end face 33 is abutted on the rotational ring latching surface 214 of the convex portion 215 of the sleeve 21. On this occasion, the rotational ring 31 is installed in the sleeve 21 such that the knock pin engaging cutaway portion 34 of the rotational ring 31 is same in position as the knock pin bore 216 of the sleeve 21 in a circumferential direction and is coaxial in a radial direction (procedure S2).

Next, the rotational ring fixing collar 22 is fitted into the sleeve 21 where the rotational ring 31 is installed. The rotational ring fixing collar 22 is installed to the sleeve 21 by inserting the cylindrical portion 222 in a gap between the inner circumference surface 31c of the rotational ring 31 and the first step surface 211 of the sleeve 21, and moving the same toward the sleeve 21 until the rotational ring latching surface 225 of the convex portion 224 abuts on the inside sealing surface 32 of the rotational ring 31 (procedure S3). On this occasion, the rotational ring fixing collar 22 is installed to the rotational ring 31 and the sleeve 21 such that the knock pin bore 226 of the rotational ring fixing collar 22 is same in position in a circumferential direction as and coaxial in a radial direction with the knock pin engaging cutaway portion 34 of the rotational ring 31 and the knock pin bore 216 of the sleeve 21 to form the knock pin inserting bore 231. Note that the rotational ring fixing collar 22 is formed such that the positions of the knock pin bore 226 of the rotational ring fixing collar 22 and the knock pin bore 216 of the sleeve 21 coincide with each other in an axial direction when the rotational ring latching surface 225 of the convex portion 224 is moved toward the sleeve 21 until it abuts on the inside sealing surface 32 of the rotational ring 31.

As described above, the sleeve 21, the rotational ring fixing collar 22 and the rotational ring 31 are assembled to form the knock pin inserting bore 231, and then, the knock pin 23 is inserted into the knock pin inserting bore 231 from the inner circumference surface of this assembled structure (procedure S4).

Through these procedures, the assembled structure of the rotational ring 31, the sleeve 21 and the rotational ring fixing collar 22 can be assembled.

Thus-assembled structure of the rotational ring 31, the sleeve 21 and the rotational ring fixing collar 22 is fixedly installed on the rotary shaft 70 by the sleeve collar 25.

The assembled structure having the rotational ring 31, the sleeve 21 and the rotational ring fixing collar 22 is positioned by the set plate 63 and mounted on the rotary shaft 70. As mentioned above, the outside outer circumference portion of the cover portion 10 is formed with the positioning groove 126, and when the rotational ring 31 is installed on the rotary shaft, a plurality of set plates 63 is arranged along with the positioning groove 126 with equal interval, so as to fit the convex portion 64 of the set plate 63 into the positioning groove 126. Each set plate 63 is fixedly installed by the socket bolt 65.

By positioning the sleeve collar 21 to the set plate 63, the set plate 63 and the sleeve collar 21 have a predetermined position relation, and a relative position relation among the cover portion 10 where the set plate 63 is mounted, and the sleeve 20 and rotational ring fixing collar 22 which are integrally fitted into the sleeve collar 21 can be set in the desired position relation. As a result, the rotational ring 31 sandwiched by the sleeve 21 and the rotational ring fixing collar 22, and the inside stationary ring 41 and outside stationary ring 51 mounted in the cover portion 10 can be constituted to have a desired position relation. Also, the sealing surface 42 of the inside stationary ring 41 and the inside sealing surface 32 of the rotational ring 31, and the sealing surface 53 of the outside stationary ring 51 and the outside sealing surface 33 of the rotational ring 31 can be constituted to have predetermined position relations respectively, and the inside seal portion 40 and outside seal portion 50 which sealingly contact and slide at a predetermined pressure can be constituted.

Note that in the mechanical seal device 1, the rotational ring 31, the inside stationary ring 41 and the outside stationary ring 51 are respectively prepared by a material such as silicon carbide (SiC), carbon, cemented carbide. Preferable combination of the inside stationary ring 41 or outside stationary ring 51 with the rotational ring 31 is respectively a combination of silicon carbide (SiC) and silicon carbide (SiC), a combination of carbon and silicon carbide (SiC), a combination of cemented carbide and cemented carbide, or a combination of carbon and cemented carbide.

Also, for a material of each O-ring of the mechanical seal device 1, fluorine-contained rubber, nitrile rubber, EPDM, perfluoroelastomer and the like can be used.

Thus, in the mechanical seal device 1 of the present embodiment, the rotational ring 31 is fixed on the rotary shaft 70 by using the rotational ring fixing collar 22 and the knock pin 23 in addition to the sleeve 21, and the rotational ring 31 is fixed with a very simple constitution. Namely, the rotational ring 31 is fixed with the knock pin 23 without using a constitution such as a bolt hole and a seal nut, which requires processing for screw cramp. Consequently, it is possible to fixedly install the rotational ring 31 on the rotary shaft 70 with a compact structure without a need for a large space both in an axial direction and in a radial direction.

Also, in the mechanical seal device 1 of the present embodiment, the rotational ring 31 is sandwiched by the rotational ring latching surface 214 of the sleeve 21 and the rotational ring latching surface 225 of the rotational ring fixing collar 22, and the rotational ring 31 can be supported on a surface in both an inside direction and an outside direction, i.e. both a positive pressure direction and a negative pressure direction. Therefore, if the negative pressure acts thereon, the sealing surface of the rotational ring 31 may not be distorted, and stable seal properties can be obtained.

Also, when the pressure in an inside direction acts or the pressure in an outside direction acts, i.e. either the positive pressure or negative pressure acts, the rotational ring 31 may not move in an axial direction, and the position of the rotational ring 31 can stably be retained, resulting in stable seal properties on that point as well.

Also, in the mechanical seal device 1 of the present embodiment, the rotational ring fixing collar 22 is also unified with a conventionally used baffle knock pin 23 for the rotational ring 31. Therefore, the mechanical seal device 1 of the present embodiment can be produced very inexpensively, which is effective.

Note that the above-mentioned embodiment is introduced for easily understanding the present invention, and is not limited to the present invention in any way. Each component disclosed in the present embodiment may include every possible modification in design and equivalent within the technical scope of the present invention, and any preferable modification in various ways is available.

For example, the details of the constitution of the rotational ring fixing portion 20 may arbitrarily be changed.

For example, the detailed constitutions of the sleeve 21 and the rotational ring fixing collar 22 may arbitrarily be changed, and the number and arrangement of the knock pin 23 unifying these components may arbitrarily be changed.

Also, the configurations of the rotational ring 31, the inside stationary ring 41 and the outside stationary ring 51, etc., and installed constitution may arbitrarily be changed.

For example, in the above-mentioned embodiment, the inside stationary ring 41 and the outside stationary ring 51 are seal rings having substantially same constitution, and are symmetrically arranged with a central focus on the rotational ring 31. However, the inside stationary ring 41 and the outside seal ring 51 may be different in constitution. For example, a seal ring with different balance may be used for the inside stationary ring 41 or the outside stationary ring 51 depending on the environment of usage, e.g. when the mechanical seal device 1 is used in the atmosphere, etc.

INDUSTRIAL APPLICABILITY

The present invention is applicable as a shaft seal device for a rotary shaft to any apparatus having a rotary shaft. For example, the present invention can be used for axial seal and the like of a centrifugal pump, stirring machine and the like.

The invention claimed is:

1. A mechanical seal device comprising:
a rotational ring installed on a rotary shaft to integrally rotate with the rotary shaft and formed with a sealing surface on at least one of its surfaces in an axial direction;
a stationary ring formed with a sealing surface to sealingly contact and slide with said sealing surface of said rotational ring;
a rotational ring fixing portion for fixing said rotational ring to said rotary shaft; and
a cover portion for containing said rotational ring and said stationary ring and for supporting said stationary ring so as to press the stationary ring axially in a direction of said rotational ring, wherein:
said rotational ring fixing portion comprises
a sleeve fixed on a surrounding surface of said rotary shaft, the sleeve having a rotational ring latching surface for latching together said rotational ring axially from outside or inside, and a through-bore in a radial direction for inserting a knock pin; and
a rotational ring fixing collar fitted into said sleeve and arranged on axially inside or outside of the sleeve, the rotational ring fixing collar having a rotational ring latching surface for latching together said rotational ring from an opposing direction of said rotational ring latching surface of said sleeve, and a through-bore for inserting a knock pin in a radial direction communicating to said through-bore of said sleeve when the collar is fitted into said sleeve; and
said rotational ring is axially sandwiched by said rotational ring latching surface of said sleeve and said rotational ring latching surface of said rotational ring fixing collar, and is fixed to said sleeve and said rotational ring fixing collar in a circumferential direction by engaging a knock pin inserted through said through-bores communicated with each other from an inner circumference side to a concave portion formed on the rotational ring.

* * * * *